United States Patent [19]

Lee

[11] Patent Number: 5,329,378
[45] Date of Patent: Jul. 12, 1994

[54] FACSIMILE DEVICE WITH A WHITE LEVEL CONTROLLER

[75] Inventor: Hyo-jin Lee, Anyang-city, Rep. of Korea

[73] Assignee: SamSung Electronics Co., Ltd., Kyungki-do, Rep. of Korea

[21] Appl. No.: 978,385

[22] Filed: Nov. 18, 1992

[51] Int. Cl.$^5$ .................... H04N 1/00; H04N 1/40
[52] U.S. Cl. .................... 358/406; 358/400; 358/461
[58] Field of Search ............ 358/400, 406, 461, 496, 358/498, 401, 474, 494

[56] References Cited

U.S. PATENT DOCUMENTS

| | | | |
|---|---|---|---|
| 4,907,077 | 3/1990 | Schulz-Hennig et al. | 358/80 |
| 4,970,606 | 11/1990 | Shima | 358/498 |
| 5,101,284 | 3/1992 | Tanabe | 358/461 |
| 5,107,350 | 4/1992 | Omori | 358/461 |
| 5,187,588 | 2/1993 | Stemmle | 358/498 |

FOREIGN PATENT DOCUMENTS

| | | |
|---|---|---|
| 58-096453 | 6/1983 | Japan . |
| 58-200668 | 11/1983 | Japan . |
| 59-108451 | 6/1984 | Japan . |
| 59-215171 | 12/1984 | Japan . |
| 60-154769 | 8/1985 | Japan . |
| 63-247881 | 10/1988 | Japan . |

Primary Examiner—Edward L. Coles, Sr.
Assistant Examiner—Thomas D. Lee
Attorney, Agent, or Firm—Robert E. Bushnell

[57] ABSTRACT

A facsimile includes a white level controller having a support and a guide member which is coupled to the support to be movable up and down, the bottom of which is in contact with the glass plate of a reading device by its own weight, and in the lower portion of which a white reflection surface is formed, thereby simplifying the structure and facilitating the source-document conveyance.

18 Claims, 2 Drawing Sheets

FACSIMILE DEVICE WITH A WHITE LEVEL CONTROLLER

BACKGROUND OF THE INVENTION

The present invention relates to a facsimile, and particularly to a facsimile which facilitates paper conveyance and has a simplified structure and an improved white level controller so as to accomplish uniform picture quality.

Generally, a facsimile has a white level controller for determining the relative brightness of a source document by reflecting light projected from a reading device back to the reading device before the source document is actually read.

Such a conventional white level controller for a facsimile, as schematically shown in FIG. 1, is constructed to comprise a white rubber roller 4 installed to be resiliently in contact with a glass 3 by a spring 5 on glass plate 3 installed on the top of a reading device 1 to facilitate conveying source document 2 along upper and lower guide plates 8 and 9, or, as in FIG. 2, to comprise a white plate 7 installed to be resiliently in contact with spring 6 on glass plate 3.

In the first case, wherein the white rubber roller of FIG. 1 is used, the white level controller for a facsimile has a complicated structure because the white rubber roller requires some means to power its rotation. Further, since the overall surface of the white rubber roller comes in contact with the glass when being rotated, if foreign matter is introduced to one or both of these surfaces, the glass may be damaged and the picture quality thus deteriorated, which also adversely affects proper maintenance.

In the other case, wherein the white plate of FIG. 2 is used, since the compression force of the spring is non-uniform, the source document conveyance is not smooth and paper jams occur.

SUMMARY OF THE INVENTION

Therefore, it is an object of the present invention to provide a high-performance facsimile wherein uniform picture quality is accomplished, source document conveyance is facilitated, and a white level controller is simplified.

To accomplish the object, there is provided a facsimile comprising: a reading device for reading a source document; and a white level controller for controlling the white level of the source document, wherein the white level controller has a support and a guide member which is coupled to the support to be movable up and down, the bottom of which is in contact with the glass plate of the reading device by its own weight, and in the lower portion of which a white reflection surface is formed.

In the present invention, in order to facilitate the conveyance of source document, the reflection surface is curved by a predetermined curvature and protrusions for providing a gap through which the source document is conveyed between the glass plate and the reflection surface, is formed on either side of the reflection surface.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Figure 1:
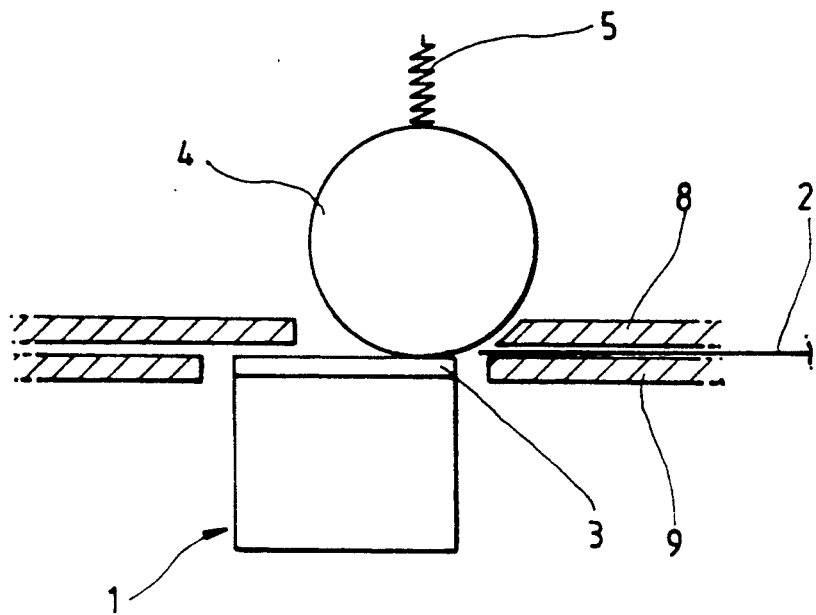
FIGS. 1 and 2 are schematic side views of white level controllers for a conventional facsimile.
Figure 2:
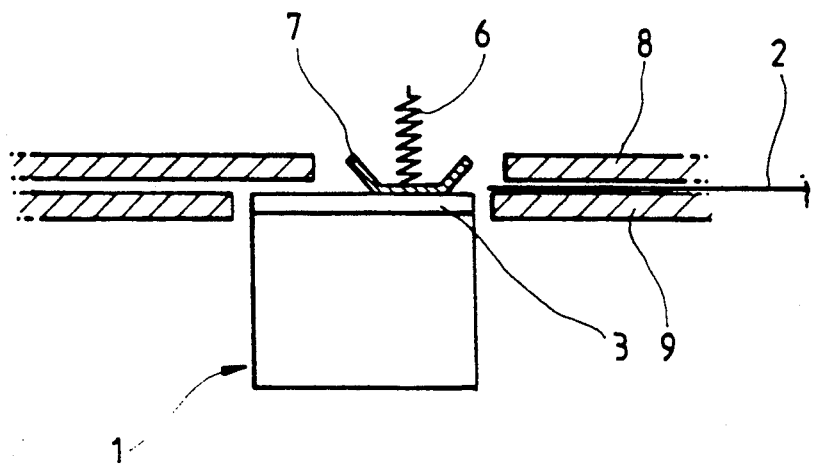
Figure 3:
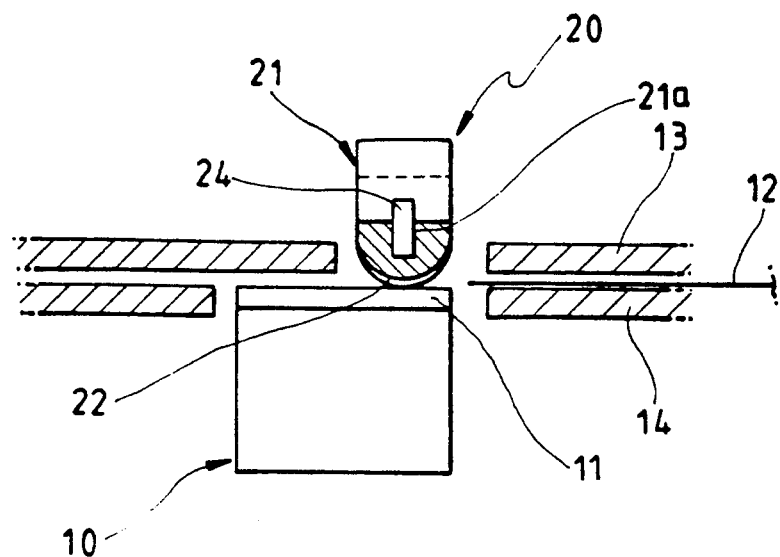
FIG. 3 is a schematic side view of a white level controller for a facsimile according to the present invention.
Figure 4:
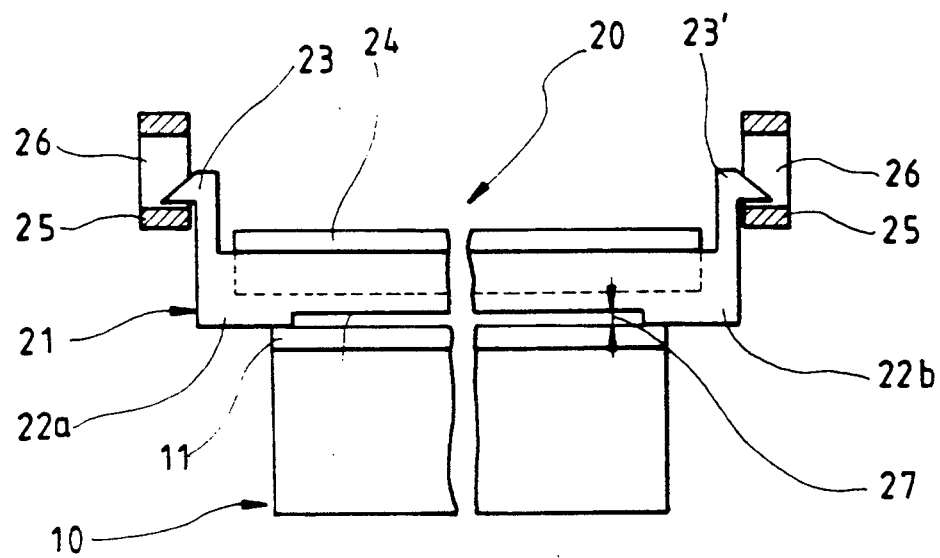
FIG. 4 is a schematic side view of the white level controller shown in FIG. 3.

Referring to FIGS. 3 and 4, the facsimile of the present invention comprises a reading device 10 installed on a glass plate 11 which facilitates the conveyance of a source document 12, upper and lower guide plates 13 and 14 for conveying source document to glass plate 11, and a white level controller 20 in contact with glass plate 11 for determining the relative brightness of source document 12 just prio to its being read source document by reflecting light projected from reading device 10 back to reading device 10.

White level controller 20 comprises a guide member 21 having a white reflection surface 22 in contact with glass plate 11 in the lower portion thereof and guide pieces 23 and 23' on either side of the guide member, so that the guide member is installed to be movable up and down along a guide groove 26 formed in a support 25.

Guide member 21 is made of resin having an inserting groove 21a in its upper portion wherein a weight 24 such as an iron core can be detachably inserted. Protrusions 22a and 22b are formed on either side of reflection surface 22 so as to provide a gap 27 between glass plate 11 and reflection surface 22, through which source document 12 is conveyed. Both reflection surface 22 and protrusions 22a and 22b are curved by predetermined curvatures for the smooth conveyance of source document 12. Here, the reflection surface may be planar.

In the facsimile of the present invention, before source document 12 conveyed along upper and lower guide plates 13 and 14 passes between guide member 21 installed in support 25 to be movable up and down and glass plate 11 of reading device 10, light projected from reading device 10 is reflected back thereto by reflection surface 22 of guide member 21. By doing this, the relative brightness of source document 12, that is, its white level is determined. Here, since guide member 21 is coupled to support 25 to be moved up and down, the facsimile of the present invention does not require a power transmission device nor, as in the case of a conventional facsimile using the white rubber roller, a spring for providing elasticity thereto. Further, since weight 24 is detachable, the weight of guide member 21 can be adjusted if necessary. Thus, the facsimile of the present invention is simplified.

Further, since protrusions 22a and 22b are provided on either side of reflection surface 22 so as to form gap 27 through which source document 12 is conveyed between reflection surface 22 and glass plate 11, the facsimile of the present invention prevents the damage of the glass plate due to the introduction of foreign matter when the white rubber roller is rotated while in contact with the glass plate in the conventional facsimile.

In addition, since reflection surface 22 of guide member 21 and protrusions 22a and 22b are curved by predetermined curvatures, the source document can be pressed uniformly, as compared with that of the spring and white plate in the conventional facsimile. This minimizes the occurrence of paper jams.

As described above, the white level controller of the facsimile of the present invention has a guide member in whose lower portion a white reflection surface is formed and which is installed to be in contact with the glass plate of the reading device by its own weight, thereby simplifying the structure, as compared with the conventional roller. Further, the reflection surface of the guide member and the protrusions have predetermined curvatures so as to form a gap between the reflection surface and glass plate through which the source document is conveyed, thereby facilitating source-document conveyance and a high-quality picture.

What is claimed is:

1. A facsimile device comprising:
 a reading device for reading a source document;
 a glass plate disposed above said reading device;
 a white level controller located above an upper portion of said glass plate, said white level controller having a white reflection surface for providing a white level indicative of a white level of the source document when read by said reading device; and
 support means comprising guide grooves and a guide member coupled to said support means, said guide member having guide tabs engaged with said guide grooves to enable said guide member to be movable up and down, for maintaining said white reflection surface with a non-rotating orientation toward said glass plate while enabling a bottom portion of said guide member to be in contact with the glass plate due to said guide member's own weight.

2. A facsimile device as claimed in claim 1, wherein said guide member comprises a groove located between said guide tabs for receiving a weight, said guide member being made of resin.

3. A facsimile device as claimed in claim 2, wherein said weight comprises an iron core and is detachable so as to adjust the weight of said guide member.

4. A facsimile device as claimed in claim 2, wherein said bottom portion of said guide member in contact with said glass plate comprises protrusions for forming a gap through which the source document is conveyed between said glass plate and said guide member, said gap forming said white reflection surface of said white level controller.

5. A facsimile device as claimed in claim 1, wherein said bottom portion of said guide member in contact with said glass plate comprises protrusions for forming a gap accommodating conveyance of the source document between said glass plate and said guide member, said gap forming said white reflection surface of said white level controller.

6. A facsimile device as claimed in claim 4, wherein said white reflection surface and said protrusions are curved by a predetermined curvature.

7. An apparatus for facsimile having glass means for supporting a document to be read, and guide plate means for guiding said document to said glass means, said apparatus comprising:
 reading means positioned adjacent to said glass means for reading said document when said document has been fed to said glass means; and
 white level controller means adjacent said glass means, said white level controller means having a white reflection surface for providing a white level indicative of a white level of said document, said white reflection surface being read by said reading means through said glass means prior to said document being fed to said glass means,
 said white level controller comprising first and second support means for maintaining said white reflection surface with a non-rotating orientation toward said glass means, said first and second support means having guide grooves and a guide member coupled to said first and second support means, said guide member having first and second guide means respectively engaged with said guide grooves of said first and second support means to enable said guide member to be movable, a first bottom portion and a second bottom portion of said guide member being in contact with said glass means due to said guide member's own weight, said first and second bottom portions being positioned apart from each other by an area defined by said white reflection surface.

8. The apparatus as set forth in claim 7, wherein said area defined by said white reflection surface is positioned apart from said glass means to enable said document to be fed between said first and second bottom portions of said guide member.

9. The apparatus as set forth in claim 8, wherein each of said first and second bottom portions of said guide member have a predetermined curvature.

10. The apparatus as set forth in claim 8, wherein each of said first and second bottom portions of said guide member and said white reflection surface have a predetermined curvature.

11. The apparatus as set forth in claim 7, wherein each of said first and second bottom portions of said guide member have a predetermined curvature.

12. The apparatus as set forth in claim 7, wherein said guide member comprises a receiving groove located between said first and second guide means for receiving a weight means.

13. The apparatus as set forth in claim 12, wherein said weight means is detachable from said guide member to enable the weight of said guide member to be adjusted.

14. The apparatus as set forth in claim 7, wherein said guide member is made of resin.

15. A facsimile device comprising:
 a reading device for reading a source document;
 a glass plate disposed above said reading means;
 a white level controller located above an upper portion of said glass plate, said white level controller being of semicylindrical shape having a white reflection curved surface disposed next to said glass plate for providing a white level indicative of a white level of the source document when read by said reading device, and a groove located along a flat surface thereof for receiving a weight; and
 support means comprising guide grooves and a guide member coupled to said guide grooves, said guide member having triangular shaped guide tabs engaged with said guide grooves to enable said guide member to be movable up and down, said guide member being constructively combined with said white level controller to enable a portion of said white reflection curved surface to contact said glass plate.

16. A facsimile device as claimed in claim 15, wherein said weight comprises an iron core and is detachable so as to adjust the weight of said white level controller 17. A facsimile device as claimed in claim 15, wherein said white reflection curved surface comprises a gap defined by said portion of said white reflection curved surface enabled to contact said glass plate for enabling said source document to be conveyed below said gap.

18. A facsimile device as claimed in claim 16, wherein said portion of said white reflection curved surface in contact with said glass plate comprises protrusions for forming a gap through which said source document is conveyed.

* * * * *

UNITED STATES PATENT AND TRADEMARK OFFICE
CERTIFICATE OF CORRECTION

PATENT NO. : 5,329,378
DATED : 12 July 1994
INVENTOR(S) : Hyo-Jin Lee

It is certified that error appears in the above-indentified patent and that said Letters Patent is hereby corrected as shown below:

Column 2,

Line 20    After "just", change "prio" to --prior--:

Signed and Sealed this

Fifth Day of November, 1996

Attest:

BRUCE LEHMAN

Attesting Officer    Commissioner of Patents and Trademarks